United States Patent [19]

Lieser

[11] Patent Number: 4,863,321
[45] Date of Patent: Sep. 5, 1989

[54] FLY-CUTTER MILLING MACHINE

[75] Inventor: Karl Lieser, Wuppertal, Fed. Rep. of Germany

[73] Assignee: Wera Werk Hermann Werner GmbH & Co., Wuppertal, Fed. Rep. of Germany

[21] Appl. No.: 193,834

[22] Filed: May 13, 1988

[30] Foreign Application Priority Data

May 30, 1987 [DE] Fed. Rep. of Germany ....... 3718262

[51] Int. Cl.⁴ .............................................. B23C 3/04
[52] U.S. Cl. ........................................ 409/165; 82/18
[58] Field of Search .................... 409/64, 65, 131, 132, 409/165, 166, 168, 80, 71; 82/18, 19, 2 E, 1.2

[56] References Cited

U.S. PATENT DOCUMENTS

| | | | |
|---|---|---|---|
| 3,715,956 | 2/1973 | Lieser | 409/165 |
| 3,742,815 | 7/1973 | Sukhov et al. | 409/132 |
| 4,141,278 | 2/1979 | Lieser | 82/18 |
| 4,164,891 | 8/1979 | Lieser | 409/165 |
| 4,606,684 | 8/1986 | Shaturov et al. | 409/132 |
| 4,692,989 | 9/1987 | Neubauer | 29/558 |

FOREIGN PATENT DOCUMENTS

| | | | |
|---|---|---|---|
| 97346 | 2/1984 | European Pat. Off. . | |
| 58174 | 12/1890 | Fed. Rep. of Germany . | |
| 911689 | 8/1954 | Fed. Rep. of Germany | 82/18 |
| 1921514 | 10/1970 | Fed. Rep. of Germany | 409/132 |
| 2650955 | 5/1978 | Fed. Rep. of Germany | 409/132 |
| 2703399 | 8/1978 | Fed. Rep. of Germany | 409/132 |
| 3410575 | 10/1985 | Fed. Rep. of Germany . | |
| 3424494 | 1/1986 | Fed. Rep. of Germany . | |
| 862890 | 3/1941 | France . | |
| 90202 | 7/1980 | Japan | 82/18 |
| 157415 | 12/1980 | Japan | 409/132 |
| 8500545 | 7/1984 | PCT Int'l Appl. . | |
| 450657 | 11/1974 | U.S.S.R. | 409/165 |
| 738771 | 6/1980 | U.S.S.R. | 82/18 |
| 944790 | 7/1982 | U.S.S.R. . | |
| 946804 | 8/1982 | U.S.S.R. | 82/18 |
| 1034839 | 8/1983 | U.S.S.R. | 409/165 |
| 1181778 | 9/1985 | U.S.S.R. | 409/165 |
| 2065012 | 6/1981 | United Kingdom . | |

Primary Examiner—William Briggs
Attorney, Agent, or Firm—Martin A. Farber

[57] ABSTRACT

A fly-cutter milling machine for the simultaneous milling of a plurality of grooves (12) in rotating workpieces (2) by means of a fly cutter (3) which protrudes radially outwards on a rotating tool holder, the speed of revolution of the tool holder and the speed of revolution of the workpiece being in a ratio which is determined by the number of grooves of the workpiece. In order to obtain optimum operation with the groove profile precisely adapted to the tool cutting edge, the rotation of the workpiece (2) is briefly interrupted at the moment of the maximum depth of plunge of the fly cutter (3) by a phase of reduced speed of the workpiece (2).

3 Claims, 3 Drawing Sheets

FLY-CUTTER MILLING MACHINE

FIELD AND BACKGROUND OF THE INVENTION

The present invention relates to a fly-cutter milling machine for the simultaneous milling of a plurality of grooves (12) in rotating workpieces (2) by means of a fly cutter (3) which protrudes radially outward on a rotating tool holder, the speed of revolution of the tool holder and the speed of revolution of the workpiece being in a ratio which is determined by the number of grooves of the workpiece.

Such a fly-cutter milling machine is known from Federal Republic of Germany Pat. No. 1 921 514. The tool-hold shaft and the workpiece turning shaft are at right angles and are skewed to each other. By use of a suitable transmission ratio, grooves to be provided on the workpiece and having the same circumferential spacing can be produced with high cutting speed. Coolant is not necessary for this, due to the free-cutting tool lip. The grooves produced in this manner are similar in their geometrical cross sectional shape to the cutting profile of a fly cutter but they are somewhat enlarged due to the free cutting. Since cross sectional shape of the grooves is dependent on the cutting profile of the fly cutter, the fly circle of the fly cutter, the diameter of the workpiece, the indexing and the depth of cut, it is necessary, upon a change in one of these parameters, to select a fly-cutter lip of different profile.

In order that, despite a change of a parameter of the tool lip which determines the profile of the groove, precisely adapted grooves can be produced on the workpiece by means of a single fly cutter. It is known from Federal Republic of Germany Pat. No. 26 50 955 to arrange the tool holder to be pivotable and lockable around a shaft, the shaft intersecting the axis of rotation of the workpiece and the tool-holder axis at right angles. The similarity in shape between groove profile and tool cutting lip requires complicated undercut fly cutters. The tool holder must also be fixed in its angular position in accordance with the groove profile desired.

The object of the present invention is to develop a fly-cutter milling machine of the type indicated in a manner which is simple to manufacture, in such a way that a groove profile which is precisely adapted to the tool cutting lip can be produced on the workpiece and that this can be done without any angular displacement of the tool holder with respect to the axis of rotation of the workpiece.

SUMMARY OF THE INVENTION

The object of the invention is achieved in combination with the machine in accordance with the introductory paragraph by rotation of the workpiece (2) which is briefly interrupted at the moment of the maximum depth of plunge of the fly-cutter (3) by a phase of reduced speed of the workpiece (2).

As a result of the development in accordance with the invention there is created a fly-cutter milling machine of this type by which, despite a change in the parameters of the cutting edge of the tool which determines the groove profile, precisely adapted grooves can be produced on the workpiece. The fly-cutter milling machine is suitable, in particular, for the production of serrated shaft profiles, blind-shaft profiles, Hirth-type serrations, splined shaft profiles and special profiles. As long as the fly cutter has not yet reached its maximum depth of plunge, free cutting takes place. At the moment of the maximum depth of plunge the rotation of the workpiece is, however, briefly interrupted while the fly cutter continues to rotate, thereby producing the groove profile which is exactly adapted in shape to its cutting profile. The brief interruption of the rotation of the workpiece by the stop position does not impair the ratio of speed of rotation between workpiece and fly cutter. As soon as the fly cutter leaves the maximum depth of plunge the rotation of the workpiece commences. Falsification of the groove profile, despite the further free cutting, however, does not then take place. The greatest depth of plunge of the fly cutter is present when it is in the 90° engagement position of the groove. This identity of shape between the groove profile and the cutting edge of the tool is obtained without having to use the complicated undercut fly cutters which otherwise would be necessary. The regrinding of the fly-cutter is then simplified. Furthermore, a longer life of the cutting edge of the tool can also be expected.

BRIEF DESCRIPTION OF THE DRAWINGS

One embodiment of the invention will be explained below with reference to FIGS. 1 to 4 of the drawing, in which.

DETAILED DESCRIPTION OF THE PREFERRED EMBODIMENTS

The fly-cutter milling machine has a pedestal base 1 within which there is a drive (not shown) arranged. By this drive a workpiece 2 and a fly cutter 3 are brought to speeds of rotation which are adapted to each other.

A chuck 4 which can be driven around a horizontal axis of rotation x serves to receive the workpiece 2. The drive of the chuck 4 and thus of the workpiece 2 is so selected that the rotation can be interrupted for a short time by a stop position and then, starting from the stop position, immediately driven again.

Figure 1:
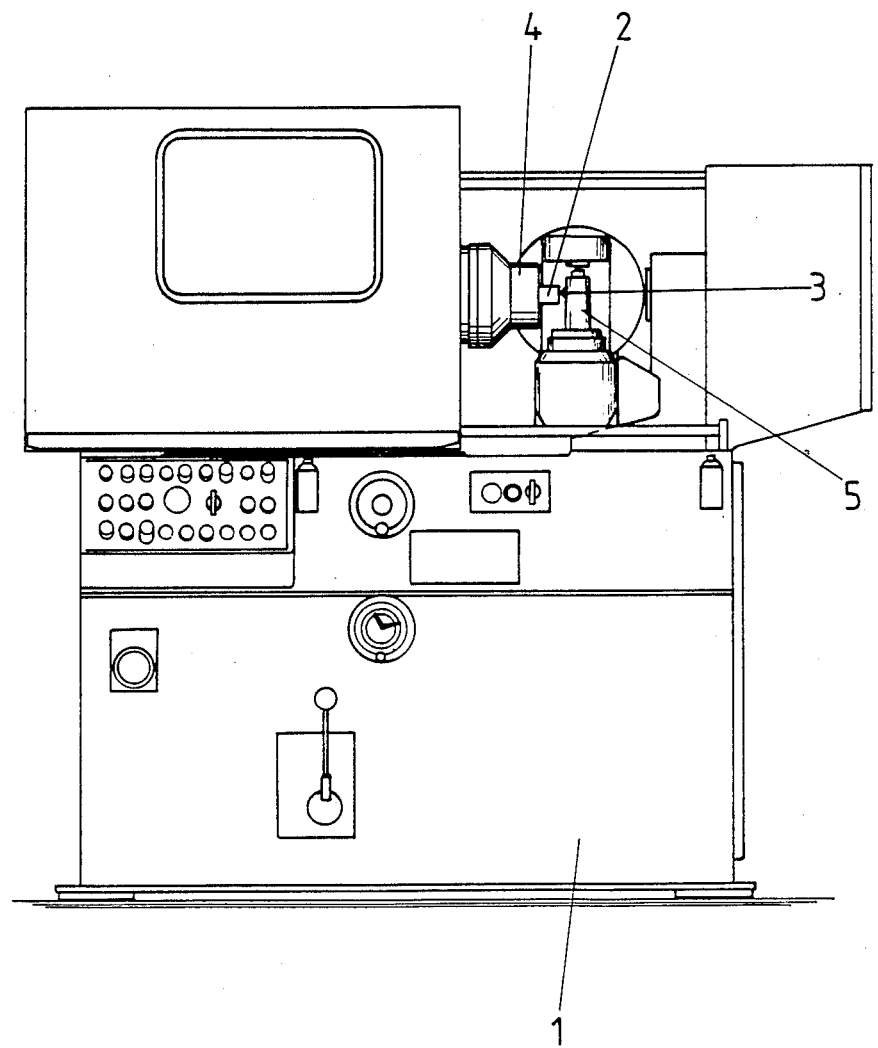
FIG. 1 is a view of a fly-cutter milling machine developed in accordance with the invention.
Figure 2:
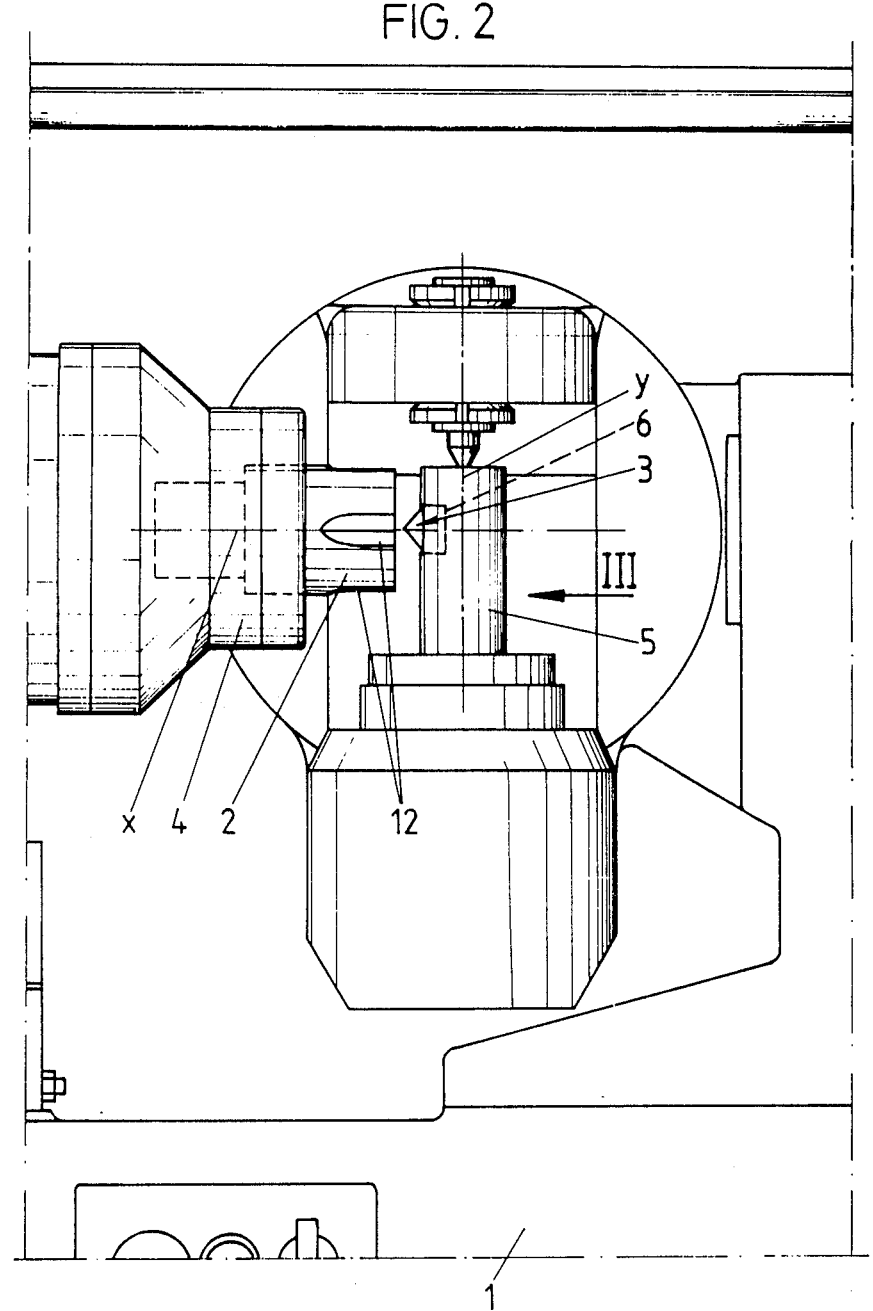
FIG. 2 shows, on a larger scale, a portion in the region of the tool holder and of the chuck which holds the workpiece.
Figure 3:
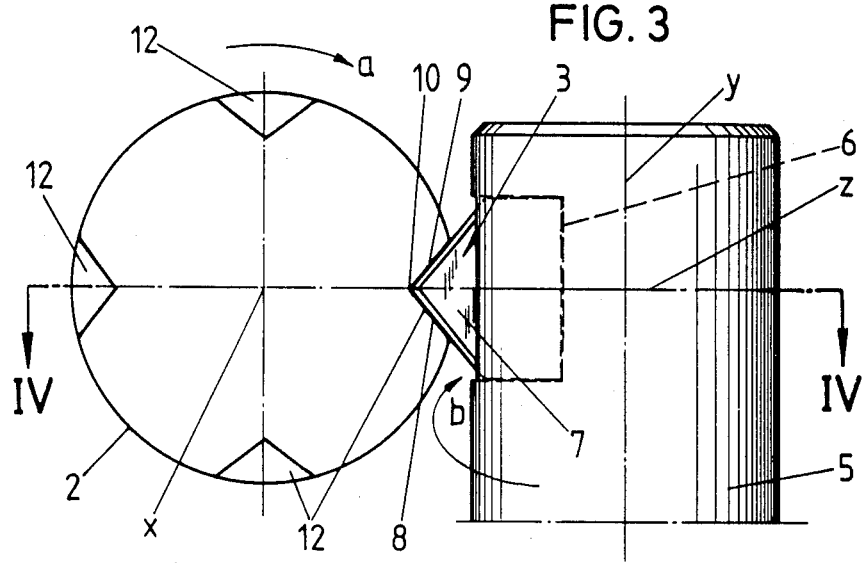
FIG. 3 is a detail view of the workpiece and miller shaft, seen in the direction of the arrow III of FIG. 2.

The fly cutter 3 is associated with a vertically directed miller shaft 5. The latter contains an insertion shaft 6 for the fly cutter 3. The latter has a triangular tool cutting edge 7 the cutting edges 8, 9 of which are undercut and come together in a tip 10 in such a manner that said tip 10 is directed radially to the tool-holder axis y. For the holding of the fly cutter 3 in the inserted position there is provided a pressure jaw 11 which clamps the fly cutter 3 in a manner which is free of vibration. In order to produce grooves 12 shown in FIGS. 3 and 4, the workpiece 2 and the fly cutter 3 are brought into such a position with respect to each other that the fly path z which passes through the tip 10 of the tool cutting edge is radial to the workpiece 2 which is shaped cylindrically in cross section and in which grooves 12 arranged in the same angular distribution in Example 4 are to be developed.

The intermittently driven chuck 4 travels in clockwise direction a as seen from the front of the workpiece 2, while the miller shaft 5 rotates in the direction of the arrow b, the chuck 4 which is arranged on a slideway which is not shown in the drawing being able, as a result of the slideway, to carry out a superimposed longitudinal movement in the direction of the arrow c.

If the four grooves arranged at equal circumferential distance apart are to be produced, then the workpiece 2 must be brought into the aforementioned corresponding vertical position with respect to the fly path z of the fly cutter 3 in such a manner that the fly cutter can plunge from the free end 2' into the work piece 2. The depth of the groove 12 is determined by the spacing adjustment between tool support axis y and workpiece rotation axis x. Upon the milling of the grooves 12, as soon as the continuously rotating fly cutter comes into the greatest depth of plunge in the groove 12, the rotation of the workpiece 2 is briefly interrupted by a stop position. At this moment, a form milling takes place due to the continued travel of the fly cutter 3 until the rotation of the workpiece suddenly starts up in accelerated fashion. Until the maximum depth of plunge is reached, the paring process by the cutting edges 8, 9 accordingly takes place within the groove profile to be produced. Even after the brief stopping of the rotation of the workpiece 2 and the following acceleration, only so much material is removed by the tool cutting edge which is still present within the workpiece that no impairing of the groove profile with respect to the shape of the cutting edge of the tool can thereby take place. After the cutting edge of the tool or the fly cutter has left the groove 12 which has just been passed through, it passes, upon the next cutting process, into the adjacent groove 12, which is then brought into corresponding position.

Figure 4:
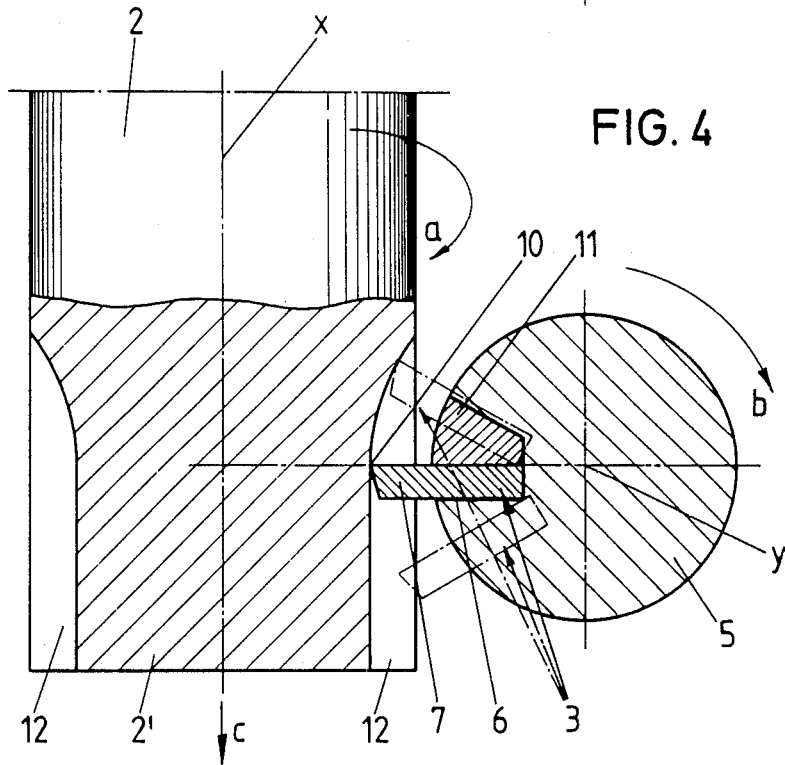
FIG. 4 is a section along the line IV—IV, the fly cutter being in the maximum depth of plunge shown in solid lines and the rotation of the workpiece being interrupted briefly by a stop position.

The maximum depth of plunge of the fly-cutter 3 can be noted in particular from FIG. 4. The radial line passing through the tip 10 of the tool cutting edge 7 is then perpendicular to the groove 12 and to the axis of rotation x of the workpiece.

An economical production of the grooves 12 is achieved in the manner that, in addition to short delays up to standstill, high accelerations can be produced. Economic operation is furthermore promoted by the fact that corresponding set-up work for the obtaining of a displacement of the inclination of the tool support axis y is no longer necessary. Furthermore, fly-cutters which are easy to grind can also be used.

Further variations with respect to the profile to be produced are possible by selecting the alignment of tool shaft to tool spindle other than 90° or making it adjustable.

Further development can, in addition, be obtained in the manner that, in accordance with the invention, the speed of rotation of the fly cutter 10 is different over the path of lip plunge than the speed over the path of emergence.

I claim:

1. A fly-cutter milling machine providing a simultaneous milling of a plurality of grooves in a rotating workpiece, the machine comprising:
    drive means for rotating the workpiece;
    a fly cutter for milling the grooves;
    a rotatable tool holder for holding the cutter, the cutter protruding radially outwards on the tool holder, a speed of revolution of the tool holder and a speed of revolution of the workpiece being in a ratio set by the number of grooves of the workpiece;
    drive means for operatively rotating the cutter; and
    control means connected to said cutter and workpiece drive means so that during operation of the machine, rotation of the workpiece is interrupted at a moment of the maximum depth of plunge of the fly cutter by a phase of reduced rotational speed of the workpiece.

2. A fly-cutter milling machine according to claim 1, wherein
    the phase of reduced speed is accomplished by use of a stop position.

3. A fly-cutter milling machine according to claim 1, wherein
    the speed of rotation of the fly cutter over a path of emergence differs from the speed over a plunged path.

* * * * *